US008286199B1

(12) United States Patent
Pulaski et al.

(10) Patent No.: US 8,286,199 B1
(45) Date of Patent: Oct. 9, 2012

(54) AUTOMATED METHOD FOR CREATING A GRAPHICAL USER INTERFACE FOR A DOCUMENT MANAGEMENT SYSTEM THAT IS VISUALLY INTEGRATED WITH AN APPLICATION HAVING LIMITED NATIVE GUI-INTEGRATION CAPABILITIES

(75) Inventors: Eric J. Pulaski, Houston, TX (US);
Roger O. Knapp, Spring, TX (US);
Mark A. Foster, Houston, TX (US);
Manikprabhu M. Rajendra, Houston, TX (US)

(73) Assignee: SmartVault Corporation, Houston, TX (US)

( * ) Notice: Subject to any disclaimer, the term of this patent is extended or adjusted under 35 U.S.C. 154(b) by 754 days.

(21) Appl. No.: 12/469,642

(22) Filed: May 20, 2009

Related U.S. Application Data

(60) Provisional application No. 61/091,331, filed on Aug. 22, 2008.

(51) Int. Cl.
*G06F 9/54* (2006.01)
(52) U.S. Cl. .......................................... 719/329; 719/328
(58) Field of Classification Search .................. 719/328, 719/329; 715/769
See application file for complete search history.

(56) References Cited

U.S. PATENT DOCUMENTS

| 5,923,326 | A * | 7/1999 | Bittinger et al. ............... 715/805 |
| 6,765,592 | B1 * | 7/2004 | Pletcher et al. ................ 715/760 |
| 2007/0296718 | A1 * | 12/2007 | Tzruya et al. ................. 345/418 |
| 2008/0114758 | A1 * | 5/2008 | Rupp et al. ........................ 707/6 |
| 2008/0115086 | A1 * | 5/2008 | Rupp et al. ...................... 715/810 |
| 2008/0134147 | A1 * | 6/2008 | McCullough et al. ........ 717/127 |
| 2008/0178083 | A1 * | 7/2008 | Bergman et al. .............. 715/704 |
| 2008/0276195 | A1 * | 11/2008 | Moromisato et al. ......... 715/783 |
| 2009/0030872 | A1 | 1/2009 | Brezina et al. |
| 2009/0204980 | A1 * | 8/2009 | Sandoval et al. ............. 719/328 |
| 2009/0249368 | A1 * | 10/2009 | Needamangala et al. .... 719/328 |
| 2009/0328080 | A1 * | 12/2009 | Margarint et al. ............ 719/329 |

FOREIGN PATENT DOCUMENTS

WO    WO 2007023252 A1 *   3/2007

OTHER PUBLICATIONS

Intuit, Inc., "QuickBooks® SDK Programmer's Guide," (Oct. 2007), [retrieved from http://developer.intuit.com/qbSDK-current/QBSDK7.0/doc/PDF/QBSDK_ProGuide.pdf].*

* cited by examiner

*Primary Examiner* — H. S. Sough
*Assistant Examiner* — Brian Wathen
(74) *Attorney, Agent, or Firm* — D. C. Toedt, III

(57) ABSTRACT

An add-on application, running on a computer, allows a user to store, in a repository, information such as (for example) document images, and to associate particular information with specified states of a host application such as the QUICKBOOKS® accounting software. When the add-on application determines, for example, that a bill is being displayed (or is about to be displayed) on the screen by the host application, the add-on application automatically obtains, and displays on the screen, information associated with the bill, such as a list or count of one or more electronic documents that are associated with the bill. In our particular embodiment, the auxiliary window is a toolbar or sidebar window located within the host application window itself. The foregoing is achieved utilizing standard host-application SDK and operating-platform API functionality, thus reducing the risk of degrading the host application's performance.

3 Claims, 2 Drawing Sheets

AUTOMATED METHOD FOR CREATING A GRAPHICAL USER INTERFACE FOR A DOCUMENT MANAGEMENT SYSTEM THAT IS VISUALLY INTEGRATED WITH AN APPLICATION HAVING LIMITED NATIVE GUI-INTEGRATION CAPABILITIES

RELATED APPLICATION

This application claims priority based on provisional patent application No. 61/091,331, filed Aug. 22, 2008, which is incorporated herein by reference.

BACKGROUND OF THE INVENTION

The invention we are disclosing and claiming here had its origins in our work developing a software package ('application') for online electronic document management, known as the SmartVault™ application, as an add-on to the well-known QUICKBOOKS® small-business accounting software published by Intuit Inc. In hindsight, it became apparent that our invention can be adapted to work with a wide variety of other software applications.

The user could also invoke the attachment functionality in other conventional ways, such as (i) by selecting the appropriate item from the menu 230; or (ii) by dragging and dropping a file from an external application such as Windows Explorer; or (iii) by actuating a suitable scanner, such as the commercially-available FUJITSU® SCANSNAP™ scanner, to scan a hard-copy document into an electronic image, possibly invoking optical character recognition functions in the process.

Some host applications, such as Microsoft Outlook, provide extensive software development kits (SDK) that enable third-party developers to create plug-in applications that can include a rich graphical user interface to provide an apparently-seamless extension of the functionality of the host application. Unfortunately, many and even most host applications, including QuickBooks, provide little if any support for such a capability in their SDKs (assuming they have an SDK at all).

Some add-on applications for QuickBooks offer a limited extended-GUI capability along these lines. None, however, provides what we considered a desirable user experience from a document-management perspective.

Some of these QuickBooks add-on products suffer from what we consider to be a significant usability problem: When (for example) a user navigates from one data record to another in QuickBooks, these add-on products do not automatically provide a conspicuous visual indicator, such as for example an icon on the QuickBooks toolbar, to let the user know that related information is available for that particular data record. If the user wants to find out whether any such documents are available, s/he must intentionally navigate to a QuickBooks menu item and click on it (or perform some other action). In our view, this leads to a lower-quality user experience.

Some such add-on products attempt to overcome this usability problem by writing a message in the memo field of the QuickBooks data record (for example, "documents have been saved for this transaction"), and/or by appending a special character such as an asterisk * to the end of the memo field. The difficulty with this approach, however, is that the user could accidentally or inadvertently overwrite the message or the special character if s/he were to edit the memo field. Moreover, a user could simply overlook the special character and not realize that documents associated with the data record were available.

SUMMARY OF THE INVENTION

In one embodiment of our invention, an add-on application, running on a computer, allows a user to store, in a repository, supplemental records containing information such as (for example) document images, and to associate particular supplemental records with specified states of a host application such as QuickBooks. The add-on application then monitors the host application as the user utilizes the host application's various capabilities. When the add-on application determines that a particular data record is being displayed (or is about to be displayed), or that some other particular state exists (or is about to exist) in the host application, the add-on application automatically obtains information about the specified data record or the specified state, such as a list or count of one or more supplemental records (for example, electronic documents) that are associated with the specified data record or the specified state. The add-on application then automatically displays, in an auxiliary window, summary information about the supplemental records (for example, a count of the number of documents that are associated with a bill being viewed on the screen), and/or the contents of one or more of the supplemental records themselves, and/or other status information. In our particular embodiment, the auxiliary window is a toolbar or sidebar window located within the host application window itself. The foregoing is achieved utilizing standard host-application SDK and operating-platform API functionality, thus reducing the risk of degrading the host application's performance.

DETAILED DESCRIPTION OF SPECIFIC EMBODIMENTS

We describe below how to make and use some specific embodiments of the invention we are claiming. In the interest of brevity and clarity, we focus on what might colloquially be called the 'secret sauce,' omitting various routine software design- and implementation details that would be apparent to (or readily discoverable by) suitably diligent persons of ordinary skill. We do not discuss, for example, the selection of appropriate programming languages; the development of user interfaces except to a limited extent; considerations of data security; and the like.

As an illustrative example, we describe how the invention helps one particular add-on application, namely the Smart-Vault application, interoperate with a particular host application, namely the QuickBooks application. In hindsight, of course, those of ordinary skill will quickly see that the invention can be implemented in other add-on applications to support other host applications.

Figure 1:
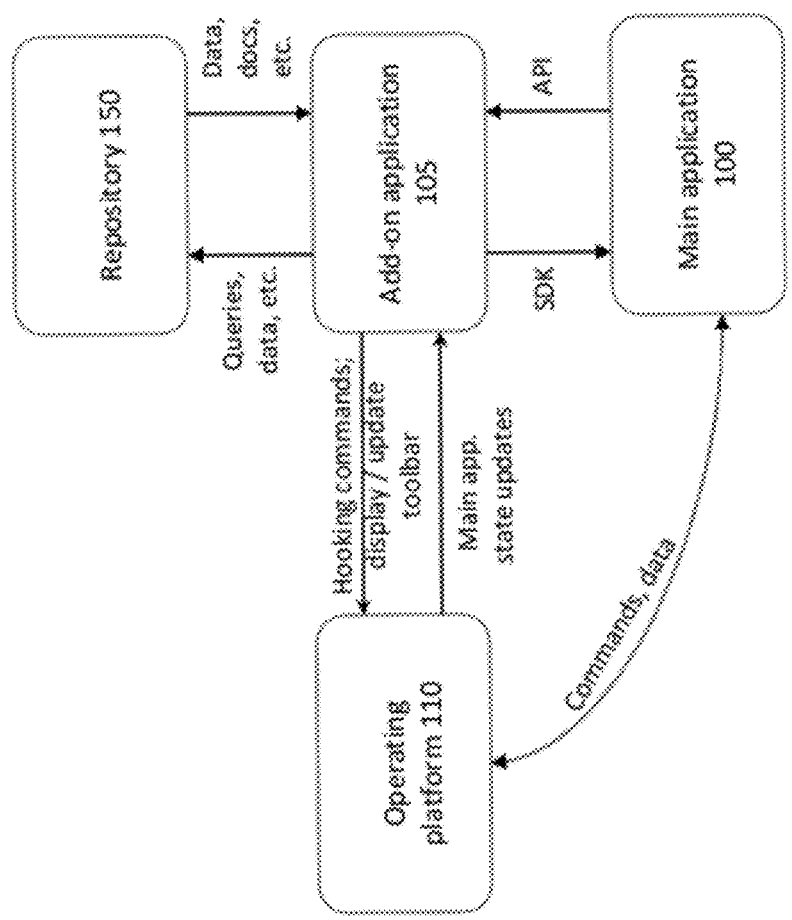
FIG. 1 is a high-level block diagram showing an add-on application in accordance with the invention, along with certain data flows that take place in its interactions with a host application, the operating platform that supports the host application, and an information repository.

THE OPERATING PLATFORM: Referring to FIG. 1 a conventional operating platform 110 provides support for a host application 100, both running on a conventional computer (not shown). In some implementations, the operating platform 110 may be an operating system such as Microsoft Windows® or a species of Unix® such as Linux®, Mac OS® X, etc. In Web-based implementations, the operating platform 110 may be a Web browser such as Firefox®, Internet Explorer®, Chrome™, Opera™, Flock™, Safari,® etc.

Figure 2:
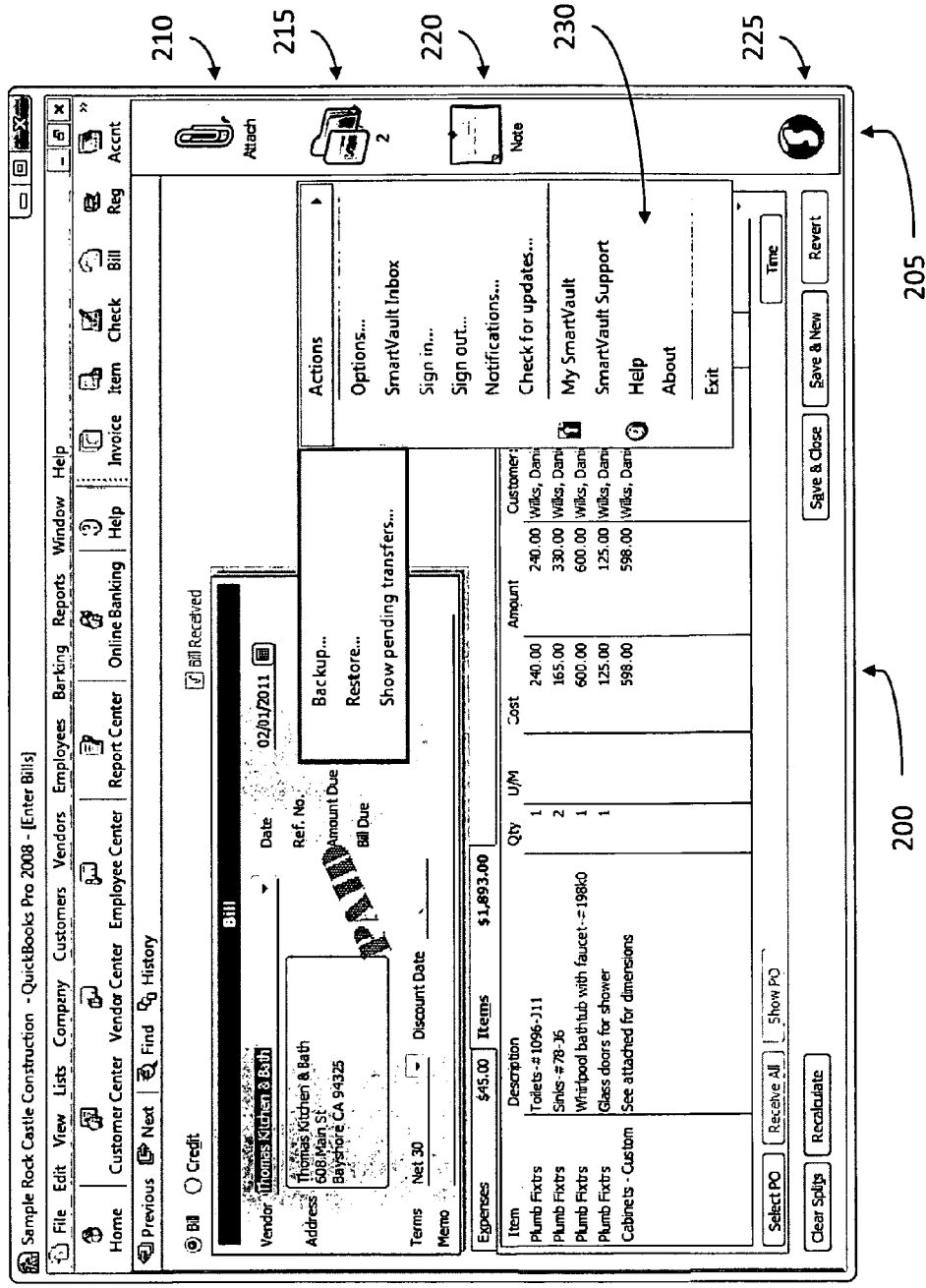
FIG. 2 is a screenshot of a window displayed by a host application (in this example, QuickBooks) together with an auxiliary window generated by an add-on application in accordance with the invention.

THE ADD-ON APPLICATION AND ITS AUXILIARY WINDOW: Referring to FIGS. 1 and 2, an add-on application 105 in accordance with our invention, also running on the computer, displays an auxiliary window 205. In our specific implementation, the auxiliary window 205 takes the form of a toolbar that appears to form part of a host application window 200. The host application window is generated by the operating platform 110 at the request of the host application 100 (in this example, the QuickBooks application). In our view, this visual integration of the add-on application 105 'into' the host application 100 provides an enhanced user experience. The auxiliary window 205 may be generated to appear as if were the rightmost portion of the host application window 200, as shown in FIG. 2, or as another suitable portion of the host application window 200. (Some alternative display modes are discussed below.)

DEFINITION: 'DATA RECORD': As used here, the term 'data record,' in respect of the host application 100, refers to identifiable information (1) that exists in one or more data stores maintained by the host application, or (2) that exists elsewhere but is expected to be imported into such a data store; or (3) that exists elsewhere but is accessed and displayed by the host application.

DEFINITION: 'SUPPLEMENTAL RECORDS': As used here, the term 'supplemental record' refers to, for example, text documents; graphic image files such as pictures; audio files; user-generated notes; emails and their attachments; contact information records such as vCards; calendar entries; and other data entities.

STARTUP of the add-on application 105 and the auxiliary window 205 can be conventionally accomplished in various ways. For example, the add-on application 105 could be started automatically when the host application 100 itself is started. Or, the add-on application 105 could be started separately from the host application 100, and then later be associated with the host application 100 through user intervention. Or, the add-on application 105 could be made to load automatically when the operating platform 110 itself starts up, and then be associated with the host application 100 when the host application is started.

REGISTRATION OF MENU ITEM: In our particular implementation with QuickBooks, at start-up (or other suitable time) the add-on application 105 registers itself with the host application 100, using the host application's SDK, to add a new menu item to the host application's menu structure. If a user were to click on the new menu item while viewing a particular data record, the host application would automatically invoke a call-back function of the add-on application, passing as one or more arguments an identifier of the relevant data record. The use of this new menu item is discussed in more detail below.

OPERATIONAL OVERVIEW: As shown at a high level in FIG. 1, in one embodiment the add-on application 105 displays the auxiliary window 205, which includes an icon and/or link allowing the user to 'attach' supplemental records to a data record. Importantly, the add-on application updates the auxiliary window automatically in response to certain state changes in the host application 100, through what we believe to be a novel combining of the following: (1) using 'hooking' techniques to monitor the state of the host application 100, that is, registering with the operating platform 115 to receive messages relating to potential state changes in the host application, indicating that the auxiliary window 105 might need to be updated; (2) in some cases, obtaining additional information from the host application 100 via its software developer kit (SDK)—or alternatively by more-laborious (and thus potentially more-problematic) methods such as screen-scraping—to get more detail regarding a potential state change, such as a record identifier for a data record currently being viewed by the user; and (3) updating the information displayed in the auxiliary window 205, possibly including retrieving related information from the repository 150. Our particular implementation uses the application programming interface (API) of the operating platform 115, in this case the Windows API, to inject the auxiliary window 105 into the host application window 200. FIG. 1 depicts some typical relevant data flows.

ASSOCIATING SUPPLEMENTAL RECORDS WITH DATA RECORDS OR HOST-APPLICATION STATES: In the example shown in FIG. 2, a conventional paperclip icon 210 offers a convenient and familiar way for a user to associate a supplemental record such as a document, file, etc., with either a specified data record or a particular state of the host application 100. For example, by clicking on the paperclip icon 210, the user causes the add-on application to store an electronic copy of the document, etc., along with related information obtained from the host application 100, in a suitable repository 150 and to associate that electronic copy with a data record then being displayed by the host application or with the then-current state of the host application. (In other implementations, associating a supplemental record with a specified data record might entail associating information with a data record that has yet to be imported into a host application data store.)

The repository 150 may be implemented as a Web server using well-known Internet protocols, or it may be local, or it may be or some combination of the two (local caching of remotely-stored data being a well-known example of the combination approach). The repository might take the form of data stored in a database or other data store maintained by the host application 100, using the host application's SDK and/or API to cause it to store repository data if that functionality is available.

The user could also invoke the attachment functionality in other conventional ways, such as (i) by selecting the appropriate item from the menu 230; or (ii) by dragging and dropping a file from an external application such as Windows Explorer; or (iii) by actuating a suitable scanner, such as the commercially-available Fujitsu ScanSnap scanner, to scan a hard-copy document into an electronic image, possibly invoking optical character recognition [OCR] functions in the process.

In FIG. 2, a document icon 215 shows the summary information that five documents are thus 'attached' to the Kristie Abercrombie invoice record. By clicking on this icon, the user can display a list of the attached documents (the list being retrieved from the repository 150 by the add-on application 105) and select one or more of them for display or other processing.

Likewise, a notes icon 220 indicates that someone has used the add-on application to 'attach' a note in the repository 150.

(Those of ordinary skill in the art will appreciate in hindsight that supplemental records can be stored in the repository 150 via means other than the add-on application 105, then later 'imported' into the host application 100 by associating particular supplemental records with particular host-application data records.)

Near the bottom of the auxiliary window 205, an optional menu icon 225 can be clicked as one way to pull up a menu 230 (which may be a multi-level menu if desired). If the menu icon 225 is not used, any convenient technique may be used to invoke the menu 230, for example by right-clicking a mouse on the auxiliary window 205, and the vacant 'real estate' in the auxiliary window may be used for other purposes, e.g., to display notification messages.

INJECTING THE AUXILIARY WINDOW: In our implementation, the add-on application 105 makes use of certain functions built into the Windows API to 'inject' the auxiliary window 205 into the host application window 200 by attaching the auxiliary window as a child window of the host application. Doing so keeps the auxiliary window 105 appropriately placed if the user takes action to move, resize, minimize, maximize, restore, etc., the host application window 200. Those of ordinary skill would of course consult the API documentation for additional details specific to their desired implementation. We found it convenient to use the CBT functions of the Windows API, which conventionally are used to help facilitate the development of computer-based training applications. These functions permit the add-on application 105 to run code within the host application process, and to directly access 'protected' memory of the host application thread. That allows the add-on application to replace the window messaging procedure ("Window Proc" in Microsoft Windows) with one supplied by the add-on application, allowing the add-on application not to only monitor the host application 100 but also to change its behavior in minor respects—for example, by handling the window message NC_CALCSIZE, thereby allowing the add-on application to resize the host application's content to make room for the auxiliary window. Extensive documentation about the CBT functions, as with other portions of the published Windows API, is readily available on the Web.

HOOKING OF HOST APP WINDOW UPDATE MESSAGES: Those of ordinary skill in the art of software development will recognize that hooking of windowing messages and other operating-platform function calls can be accomplished through a variety of known methods, including but not necessarily limited to: proxy digitally linked libraries (DLLs); import address table (IAT) patching; registering of call back functions with the host application API or the operating-system API; and API patching of the host application API. The subjects of hooking generally, and hooking of Windows function calls specifically, are discussed in publicly-available documentation, for example at the Microsoft Web pages "Hooks" (msdn.microsoft.com/en-us/library/ms632589(VS.85).aspx); "About Hooks" (msdn.microsoft.com/en-us/library/ms644959.aspx#wh_cbthook); "CBTProc Function" (msdn.microsoft.com/en-us/library/ms644977(VS.85).aspx). Likewise, documentation about QuickBooks' particular SDK is available at Intuit's Web site, for example at developer.intuit.com/technical_resources/default.aspx?id=1488. Moreover, extensive information about a wide variety of related topics can be found by using a search engine such as Google to search the World Wide Web—we note that such searching has become something of a standard practice commonly employed by persons of ordinary skill.

Our implementation makes use of Windows CBT functions (in addition to injecting the auxiliary window 205) in monitoring state change within the host application 100. The add-on application 105 uses this capability to re-sync the state when the keyboard focus changes within the host application. This prevents the add-on application from needing to 'poll' or constantly query the windowing API for the foreground window. In addition, the Windows CBT functions provide the add-on application 105 with the ability to monitor user events on UI elements, e.g., button-clicked events. That in turn allows the add-on application to know that the user has clicked a button and the ID of the button. From that information, the add-on application can determine that the user clicked, say, "Save and New" or other relevant UI buttons.

Portions of the display in the auxiliary window 205 may take the form of one or more icons that serve (a) as prompts to remind the user of the information and functions available via the add-on application 105, and/or (b) as ways for the user to access the information and/or functions, for example by clicking on an appropriate icon to display the contents of an 'attached' document. Text could of course be used in lieu of one or more icons.

DISPLAYING INFORMATION IN THE AUXILIARY WINDOW: The add-on application 105 watches for the occurrence of potentially relevant states in the host application 100, as described above, for example, changes in the data record being displayed or changes in other relevant states of the host application. If appropriate, the add-on application updates the auxiliary window 205 with information about the state, perhaps querying the repository 150 in the process.

Consider a hypothetical example: Suppose that, in response to a user command, the host application 100 switches from displaying data record X to displaying data record Y. The add-on application 105, when alerted of this state change, updates the display in the auxiliary window 205 to indicate what (if any) documents, etc. are associated with data record Y, as opposed to data record X, along with other information as appropriate.

The current state of the host application 100, at any given time, might include the user's context in the host application, for example, the fact that the user is at the host application home screen and/or has invoked a command to navigate to a different screen or take some other action. The state might also include, say, information from or about a specific data entity such as a data record.

Host-application state changes deemed 'relevant' might include, for example, the user's switching to a new area in the host application, such as going from the QuickBooks Home screen to its Report Center screen. Other relevant state changes might include, say, the user's creating a new data record, or navigating from viewing one record to viewing a different record, or any of a variety of others.

In some implementations, the information provided by the operating platform 110 might indicate only that a host-application state change could possibly have occurred. In those cases (and perhaps in others), the add-on application's logic functions might require obtaining additional information from the operating platform and/or from the host application 100. Information so obtained from the host application will usually include an identifier for the data record being or about to be displayed. The add-on application 105, therefore, should do appropriate testing to determine whether a state change has indeed occurred in the host application 100 and, if so, whether it is a relevant one.

In a Windows-based implementation, the add-on application 105 may test for a potentially relevant state change in the host application 100 in response to being notified (via the operating-platform API) that a new windowing event has occurred, for example, that the user has clicked a particular button or that a new window is being displayed for the host application.

In monitoring the state of the host application 100 and updating the auxiliary window 205, the add-on application 105 might find it necessary to query the host application 100, for example using the software developer's kit (SDK) of the host application, to obtain information about the data record (which could include some or all data contained in the record itself). In our SmartVault implementation for QuickBooks, the information so obtained generally includes the unique QuickBooks identifier of the data record. Our implementation queries the QuickBooks application indirectly: As noted above, the add-on application 105 previously registered itself with QuickBooks (that is, with the host application 100), using its SDK, to add a new menu item to the QuickBooks menu structure. As a result, if a user were to click on the new menu item, QuickBooks would automatically invoke a callback function of the add-on application, passing as one or more arguments an identifier of the relevant data record. To automate this action and eliminate the need for the user to click the new menu item, the add-on application inserts a simulated menu selection into the windowing message queue. When the QuickBooks application detects this simulated menu selection, it responds in the same way as if the user had clicked on the new menu item, that is, by passing the data record's identifier to the add-on application 105.

A significant advantage is derived from this combination of automatically monitoring the host application 100 for possible state changes, coupled with simulating a user-generated menu selection to retrieve the data record identifier. This combination enables our implementation to provide a document-management system that is visually integrated with the host application 100, even though the host application's only relevant user-interface integration capability is that of adding an item to the host application's menu structure. Furthermore, injecting the auxiliary display inside the host application window 200 provides a still-more enhanced user experience. As a result, when a user of the host application browses from one data record to another, our implementation provides the appearance of a seamlessly integrated document-management capability as part of the overall experience of using the host application.

In implementations where the host application 100 is Web-based, additional information needed by the add-on application 105 might be obtainable from arguments encoded in the uniform resource locator (URL); depending on the host application, such arguments might include detailed information about the then-current state of the host application, such as for example an identifier of the data record then being displayed. As a simple analogous example, consider a Google search-results page where the term being searched is the word "patent." The URL for the page may contain considerable information not just about the search term, but about the language used, the browser, etc., such as "www.google.com/search?q=patent&ie=utf-8&oe=utf-8&aq=t&rls=org.mozilla:en-US:official&client=firefox-a." In Web-based applications such as SalesForce.com and Outlook Web Access, the URL may include an identifier of a data record; the add-on application 105 can obtain this identifier as needed by conventionally parsing the URL.

In appropriate cases, the add-on application 105 queries the repository 150 whether any documents or other information stored there are associated with the data record in question (typically using the data record identifier as a search key) or other state of the host application 100. If so, then the add-on application 105 accordingly updates the information displayed in the auxiliary window 205.

The add-on application may also make use of information retrieved from the host application 100 or from the repository 150 to customize aspects of the functionality and/or the user interface of the auxiliary window 105.

If the host application 100 provided an SDK with appropriate support for monitoring state changes and allowing third parties to add graphical user interface elements, then another approach would be to create a plug-in that used that SDK. Even in this case, using the approach of our invention would advantageously allow (1) for such a plug-in to attach documents to relevant states in the host application that may be beyond those that would be given via the SDK, and (2) for the auxiliary window 205 to have a consistent 'look and feel' across a variety of host applications 100.

An advantage of being alerted to possible host-application state changes by the operating platform 110, as opposed to depending on notifications issued by the host application 100 itself, is that the former approach can be used with a host application that does not support the latter approach, either at all or as to particular information desired by the add-on application 105.

INFORMATION DISPLAYED IN AUXILIARY WINDOW: The information displayed in the auxiliary window 205, relating to a given data record or a given state of the host application 100, can include, for example, one or more of (1) a list of supplemental records, some or all of which may be stored in the repository 150; (2) a count of such records; (3) user-created notes associated with the current state of the host application (which could be regarded as a type of supplemental record); and/or (4) status information such as the status of a network, a remote server, database connectivity, etc., etc.

A wide variety of supplemental records may be 'attached' as described here. They may be attached not only to a data record of the host application 100 (for example, to a QuickBooks data record), but also to a specific screen display of the host application (for example, the QuickBooks Home screen).

Moreover, the auxiliary window 205 could be used to display information that might be independent of the state of the host application 100. As a hypothetical example, if the current system date were within X days of a deadline for taking an action (e.g., filing a tax return), the auxiliary window 205 could display an alert message and/or an attached document or other supplemental record relating to that action.

POSSIBLE USES: Those of ordinary skill having the benefit of this disclosure will realize in hindsight, as we did, that the system described here can be adapted for use with a wide variety of host applications 100. We came to realize that many such applications, that could likewise benefit from a visually-integrated document management solution, were 'in the same boat' as QuickBooks, in that they had limited ways (if any) to enhance the user's experience. We believe our approach would be especially useful with data-centric applications such as accounting systems; customer-relationship management (CRM) systems; personal-information management (PIM) systems; health-information systems; and any of a wide variety of other so-called vertical applications.

POSSIBLE VARIATIONS: In cases where the host application 100 generates multiple host application windows 200, the add-on application 105 may need to generate and update multiple respective auxiliary displays 205 for some or all of the various windows 200.

(The auxiliary window 205 can also be updated, of course, in response to 'external' status changes that are deemed relevant, e.g., changes in the status of a network-connected repository 150.)

The auxiliary window 205 may be displayed outside the host application window 200 at any other convenient point on the screen. In such a case, it would be desirable to have the auxiliary window 205 be attached to the host application window 200, so that the auxiliary window will appear to be an extension of the host application window. In such a state, the auxiliary window 205 would move with the host application window 200 as it is dragged to different locations on the screen, and/or resize itself in synchronization with the host application window if the user takes such action.

An attached auxiliary window 205 could be designed so that the user can selectively 'undock' it from the host application window 200, that is, make it free-standing on the screen, and/or re-dock it by dragging the auxiliary window 205 into close proximity to one of the edges of the host application window 200, or by selecting a graphical input element that causes the auxiliary window to snap onto the host application window. Docking and undocking of windows are known conventional techniques.

Our investigations indicated, however, that an attached auxiliary window 205 likely would be a more complex undertaking (and therefore more 'expensive' in terms of time required for software development and maintenance and of processor performance), because it would necessitate greater attention to 'corner cases' and the like. We also believe that the visually-integrated approach previously described, involving injecting the auxiliary window 205 into the host application window 200, will often be preferred by users.

The add-on application 105 could use other, non-hooking methods to monitor the host application 100 for potentially relevant state changes. These might include, for example, polling- and screen-scraping techniques to obtain information about the current active window being displayed by the host application 100.

The add-on application 105 may expand the auxiliary window 205, perhaps creating (for example) a pop-up or pop-under window or bubble (not shown), to provide additional information and options associated with the data record in question. The additional information could include, for example, the file name of a given document associated with the data record; a brief description of the document; the date the document was stored or added to the repository 150; the name of the user who added the document; the current status of the document; or the content of one or more attached documents, either verbatim or in some representative form such as a thumbnail image.

PROGRAMMING; PROGRAM STORAGE DEVICE: The add-on application described above may be implemented by providing suitable programming for a general-purpose computer. The programming may be accomplished through the use of one or more program storage devices readable by the computer, either locally or remotely, where each program storage device encodes all or a portion of a program of instructions executable by the computer for performing the operations described above. The specific programming is conventional and can be readily implemented by those of ordinary skill having the benefit of this disclosure. A program storage device may take the form of, e.g., a hard disk drive, a flash drive, a network server (possibly accessible via conventional Internet communication protocols), or other forms of the kind well-known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here.

We claim:

1. A method, executed by an add-on application supported by an operating platform running on a computer, said method comprising:
   (a) registering one or more aspects of the add-on application with a host application that is also supported by the operating platform;
   (b) injecting an auxiliary window into a host application window, generated by the operating platform at the request of the host application, using one or more function calls of an application programming interface (API) of the operating platform;
   (c) determining, through interaction with the operating platform, that the host application is displaying a specified data record;
   (d) simulating a user action in the host application that causes the host application to pass, to the add-on application, an identifier of the specified data record;
   (e) obtaining information about one or more supplemental records that (i) are associated with the identifier, and (ii) are stored in a repository; and
   (f) displaying, in an auxiliary window, information about at least one of said supplemental records.

2. The method of claim 1, wherein the add-on application is a document-management application.

3. The method of either of claims 2 or 1, further comprising (1) receiving a command from a user, said command specifying a supplemental record to be retrieved; and (2) retrieving at least a portion of the content of said supplemental record from the repository.

* * * * *